United States Patent
Cheng et al.

(10) Patent No.: US 6,236,908 B1
(45) Date of Patent: May 22, 2001

(54) VIRTUAL VEHICLE SENSORS BASED ON NEURAL NETWORKS TRAINED USING DATA GENERATED BY SIMULATION MODELS

(75) Inventors: Jie Cheng, Ann Arbor; Stephanie Mary LaCrosse, Allen Park; Anya Lynn Tascillo, Canton; Charles Edward Newman, Jr., Flat Rock; George Carver Davis, Ypsilanti, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 173 days.

(21) Appl. No.: 08/852,829

(22) Filed: May 7, 1997

(51) Int. Cl.[7] ................................. G06F 7/00; B60T 7/12
(52) U.S. Cl. ............................. 701/1; 701/102; 701/106; 701/29; 706/23; 706/25
(58) Field of Search ................................ 701/1, 2, 36, 29, 701/31, 33, 34, 23, 27, 40, 101, 102, 103, 106; 706/20, 21, 22, 23, 24, 25, 10, 14, 16, 31, 41, 905; 364/150, 151, 528.01, 528.15; 382/157, 190, 280

(56) References Cited

U.S. PATENT DOCUMENTS

| | | | |
|---|---|---|---|
| 5,130,936 | * | 7/1992 | Sheppard et al. ................... 702/123 |
| 5,212,765 | * | 5/1993 | Skeirik ................................. 706/23 |
| 5,274,714 | * | 12/1993 | Hutcheson et al. ................ 382/157 |
| 5,313,407 | * | 5/1994 | Tiernan et al. ................ 364/528.15 |
| 5,361,213 | | 11/1994 | Fujieda et al. ...................... 701/111 |
| 5,386,373 | * | 1/1995 | Keeler et al. .................... 364/528.01 |
| 5,539,638 | | 7/1996 | Keeler et al. ........................... 701/29 |
| 5,548,528 | * | 8/1996 | Keeler et al. ........................... 702/22 |
| 5,559,285 | * | 9/1996 | Bryant et al. ......................... 73/117.3 |
| 5,583,964 | | 12/1996 | Wang ..................................... 706/41 |
| 5,625,750 | * | 4/1997 | Puskorius et al. ..................... 706/21 |
| 5,745,653 | * | 4/1998 | Jesion et al. .......................... 706/23 |
| 5,781,700 | * | 7/1998 | Puskorius et al. ..................... 706/25 |

OTHER PUBLICATIONS

"Mapping Engines with Analytical Models and Neural Networks", by Jie Cheng et al, Ford Research Laboratory, Dearborn, MI, pp. 864–867.

(List continued on next page.)

*Primary Examiner*—Jacques H. Louis-Jacques
(74) *Attorney, Agent, or Firm*—Jerome R. Drouillard

(57) ABSTRACT

A virtual vehicle sensor includes a neural network which produces a sensor output based on a linear combination of non-linear physical signals generated by conventional physical sensors. Instead of determining an output directly, the neural network determines the polynomial coefficients as functions of the physical signals indicative of other engine operating parameters. The sensor is manufactured using relatively limited data collection to calibrate a simulation model. The output of the simulation model is used for model-based mapping to generate more comprehensive maps used for training the neural network. The trained neural network is embedded in a controller and acts as the virtual sensor to monitor engine parameters which are difficult to measure or for which conventional physical sensors do not currently exist. The virtual sensor may be used to sense parameters such as in-cylinder residual mass fraction, emission levels, in-cylinder pressure rise during combustion, and exhaust gas temperature.

8 Claims, 3 Drawing Sheets

OTHER PUBLICATIONS

SAE Technical Paper No. 790290, "Comparison of Model Calculations and Experimental Measurements of the Bulk Cylinder Flow Processes in a Motored PROCO Engine", G.C. Davis et al, Feb. 26–Mar. 2, 1979, pp. 1–33.

"The Effect of Inlet Velocity Distribution and Magnitude on In–Cylinder Turbulence Intensity and Burn Rate—Model Versus Experiment", by C.G. Davis et al, Journal of Engineering for Gas Turbines and Power, Jul. 1988, vol. 110, pp. 509–514.

SAE Technical Paper No. 890679, "The Effects of Load Control with Port Throttling at Idle—Measurements and Analyses", By C.E. Newman et al, Feb. 27–Mar. 3, 1989, pp. 1–13.

SAE Technical Paper No. 922165, "Monte Carlo Simulation of Cycle By Cycle Variability", by Diana D. Brehob et al, Oct. 19–22, 1992, pp. 1–13.

SAE Technical Paper No. 932751, "The Effect of Valve Overlap on Idle Operation: Comparison of Model and Experiment", by H.A. Cikanek, Oct. 18–21, 1993, pp. 1–9.

* cited by examiner

VIRTUAL VEHICLE SENSORS BASED ON NEURAL NETWORKS TRAINED USING DATA GENERATED BY SIMULATION MODELS

TECHNICAL FIELD

The present invention relates to virtual vehicle sensors which use neural networks trained using a simulation model to monitor a vehicle parameter.

BACKGROUND ART

Modern engines utilize an electronic engine control module (ECM) to continuously monitor and control engine operation to optimize fuel economy, emissions control, and performance. The ECM uses various physical sensors to collect information reflecting current operating conditions. The information is used to generate output signals for various actuators which control operation of the engine. Using the actuators, the ECM controls the air-fuel ratio, fuel injection, ignition timing, and various other functions to control operation of the engine. Optimal control of the engine over a wide range of engine operating conditions (and ambient conditions) depends on the availability, accuracy, and reliability of data gathered by the engine sensors.

An ideal engine control system would be capable of directly measuring each engine operating parameter which affects any control variable. However, any realizable design is subject to considerations such as the cost, durability, repairability, and/or technological feasibility (including packaging considerations) of appropriate sensors. The deployment of more and more physical sensors results in per-unit cost penalties in development and manufacturing. Replacement and repair costs also rise due to the increased number of sensors and difficulty in diagnosing sensor malfunctions. As such, actual systems typically involve design compromises to accommodate technological difficulties and reduce the cost and complexity of the physical system employed to monitor and control the engine. It is therefore desirable to improve the availability, accuracy, and reliability of data used to effect engine control without significantly impacting the cost, complexity, or repairability of the vehicle.

SUMMARY OF THE INVENTION

A general object of the present invention is to use one or more neural networks within the ECM which act as virtual sensing devices to replace or enhance traditional physical engine sensors. The neural networks are trained using data produced by a simulation model calibrated with actual engine test data. Use of the simulation model reduces the development time required while providing insight into the effect of various design parameters on engine operation.

In carrying out the above object and other objects, features, and advantages of the present invention, a method for controlling a vehicle component using a plurality of physical sensors for sensing first operating parameters and a controller in communication with the plurality of physical sensors includes monitoring signals generated by the plurality of physical sensors to determine values for the first operating parameters and processing the values for the first operating parameters using a neural network embedded in the controller to determine a value for a second operating parameter. The value for the second operating parameter is based on a linear combination of the plurality of values for the first operating parameters such that the neural network functions as a sensor for the second operating parameter. The method also includes controlling the vehicle component based on the value of the second operating parameter.

The neural network is trained using data generated by a simulation model. The simulation model is calibrated using test data gathered during operation of the vehicle component. The trained neural network is embedded in the controller to function as a virtual sensor to sense the second operating parameter to provide improved control of the vehicle component.

Numerous advantages are associated with the present invention. For example, the present invention allows sensing of operating parameters which are currently difficult or cost-prohibitive to measure directly. The present invention utilizes simulation models to generate more comprehensive data representing more operating conditions than would be economically feasible using traditional testing and mapping. The comprehensive data results in more accurate training of the neural networks thereby leading to a more accurate sensor. The sensor may be used to provide monitoring of fundamental physical quantities characterizing operation of the vehicle components which are otherwise unavailable using physical sensors. The present invention is applicable to a wide variety of control systems although particularly suited for control of vehicle engines.

The above advantages, and other advantages, objects, and features of the present invention, will be readily apparent from the following detailed description of the best mode for carrying out the invention when taken in connection with the accompanying drawings.

BEST MODE FOR CARRYING OUT THE INVENTION

Figure 1:
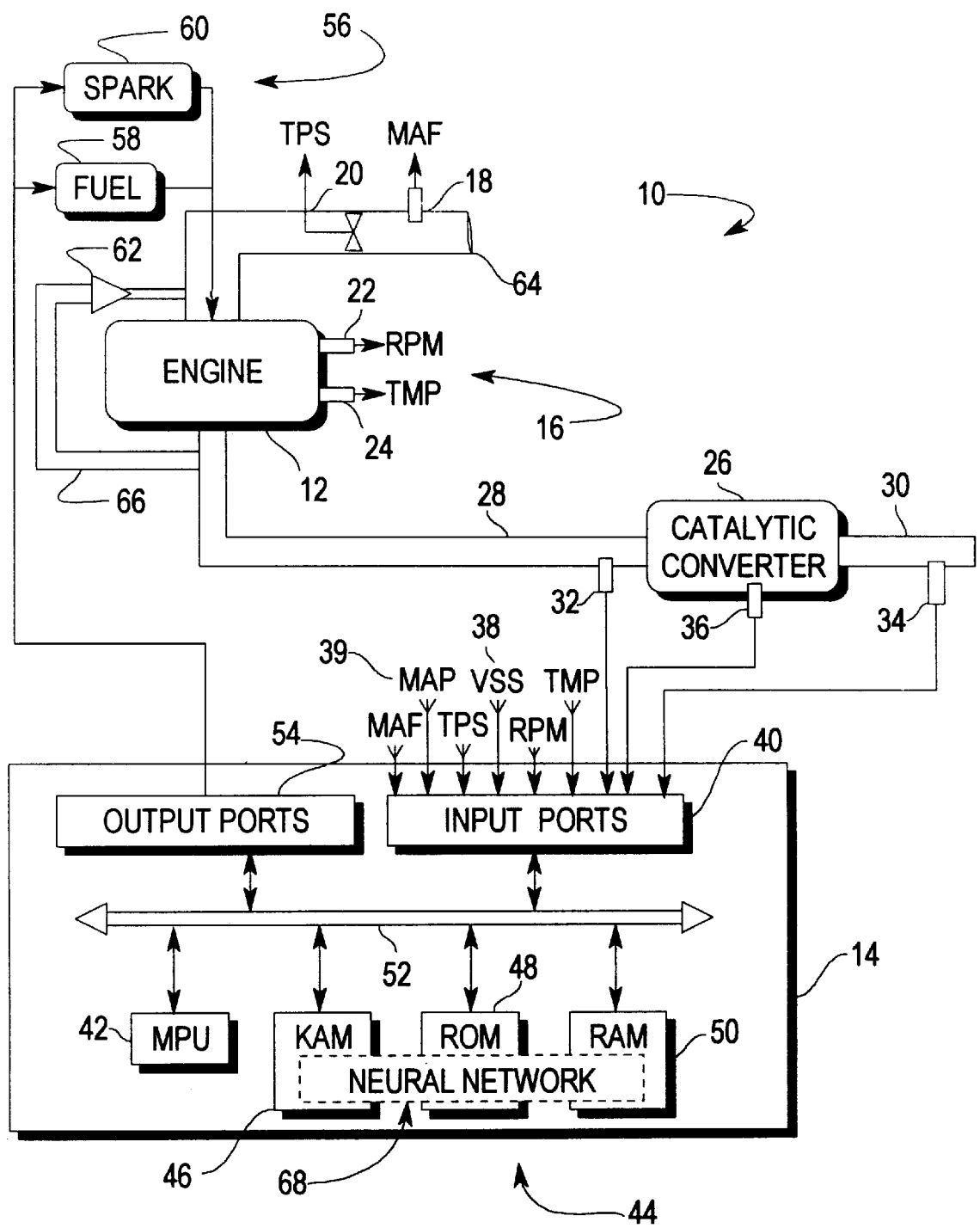
FIG. 1 is a block diagram illustrating an engine control application utilizing one embodiment of the present invention.

Referring now to FIG. 1, a block diagram is shown illustrating one potential application for a virtual sensor according to the present invention. A control system 10 includes a vehicle component such as engine 12 in communication with a controller 14. System 10 includes a plurality of physical sensors, indicated generally by reference numeral 16. Any number of physical sensors 16 may be used depending upon the particular application and the particular vehicle component being controlled. Physical sensors 16 may include a mass air flow (MAF) sensor 18, a throttle position sensor (TPS) 20, an engine speed sensor (RPM) 22, and/or a coolant temperature (TMP) sensor 24.

In many gasoline-powered automotive applications, engine 12 is coupled to a catalytic converter 26 via an exhaust pipe 28. Catalytic converter 26 is typically coupled to a muffler (not specifically illustrated) via exhaust pipe 30. In these applications, additional physical sensors 16 may include an upstream exhaust gas oxygen (EGO) sensor 32, a downstream EGO sensor 34, and a catalytic converter temperature sensor 36. Various other vehicle sensors may also be included, such as vehicle speed sensor (VSS) 38 and manifold absolute pressure (MAP) sensor 39.

In operation, controller 14 monitors signals generated by physical sensors 16 to determine values for the corresponding operating parameters of engine 12. Signals generated by physical sensors 16 are communicated to one or more input ports 40. Appropriate signal conditioning, buffering, circuit protection, and signal conversion is typically provided by circuitry within controller 14. For example, a temperature signal generated by coolant temperature sensor 24 may be filtered, buffered, and converted to a digital signal by the circuitry within controller 14 prior to passing through input ports 40.

Controller 14 of FIG. 1 preferably includes a microprocessor unit (MPU) 42 in communication with various computer-readable storage media, indicated generally by reference numeral 44. Computer-readable storage media 44 may include various types of volatile and non-volatile memory such as keep-alive memory (KAM) 46, read only memory (ROM) 48, and random access memory (RAM) 50. Computer-readable storage media 44 communicate with microprocessor 42 via address and data bus 52. Microprocessor 42 processes values corresponding to various operating parameters as indicated by the signals received through input ports 40 in accordance with data and instructions stored in computer-readable media 44.

Microprocessor 42 generates control and command signals which are communicated via output ports 54 to various actuators, indicated generally by reference numeral 56. Actuators may include a fuel controller 58 which provides appropriate signals for one or more fuel injectors (not specifically illustrated). Other actuators may include a spark controller 60 and an exhaust gas recirculation (EGR) valve 62. EGR valve 62 is used to control the amount of exhaust gases routed from exhaust 28 to intake 64 via plumbing 66.

As also illustrated in FIG. 1, controller 14 includes a neural network-based virtual sensor 68 according to the present invention. The virtual sensor is preferably embedded within controller 14 and may exist across or within one or more computer-readable storage media 44. For example, various instructions may be stored in one type or one physical storage media while working data is stored in another physical device which may or may not be of the same type of storage media.

Virtual sensor 68 may be used to determine a value for an engine operating parameter which is difficult or costly to measure directly. Values for various physical-based parameters are input to virtual sensor 68, such as those values which represent the physical signals generated by physical sensors 16. Various other signals may provide input to virtual sensor 68 to dynamically determine values for various engine operating parameters. Such signals may be indicative of air/fuel ratio, cam timing, air charge temperature, oil temperature, and the like. Virtual sensor 68 forms a linear combination of non-linear functions of physically-based parameters. Virtual sensor 68 then determines values for various other engine operating parameters which are difficult to measure. Such parameters may include residual mass fraction, emissions, knock index, peak pressure rise rate, exhaust gas temperature, and exhaust gas oxygen content. The output from one or more virtual sensors enables controller 14 to better account for the internal processes of engine 12. This information may be used to improve control of engine 12 by adjusting various functions such as spark timing, EGR level, fuel injection timing, cam timing, or fuel pulsewidth to minimize fuel consumption, emissions, knock tendency, engine instability, and noise, vibration, and harshness (NVH) effects. As such, the present invention improves engine control by providing information representing dynamic engine state conditions based on various non-linear relationships among physical-based signals. The non-linear relationships are captured automatically by the neural network during training, as described in greater detail herein.

Figure 2:
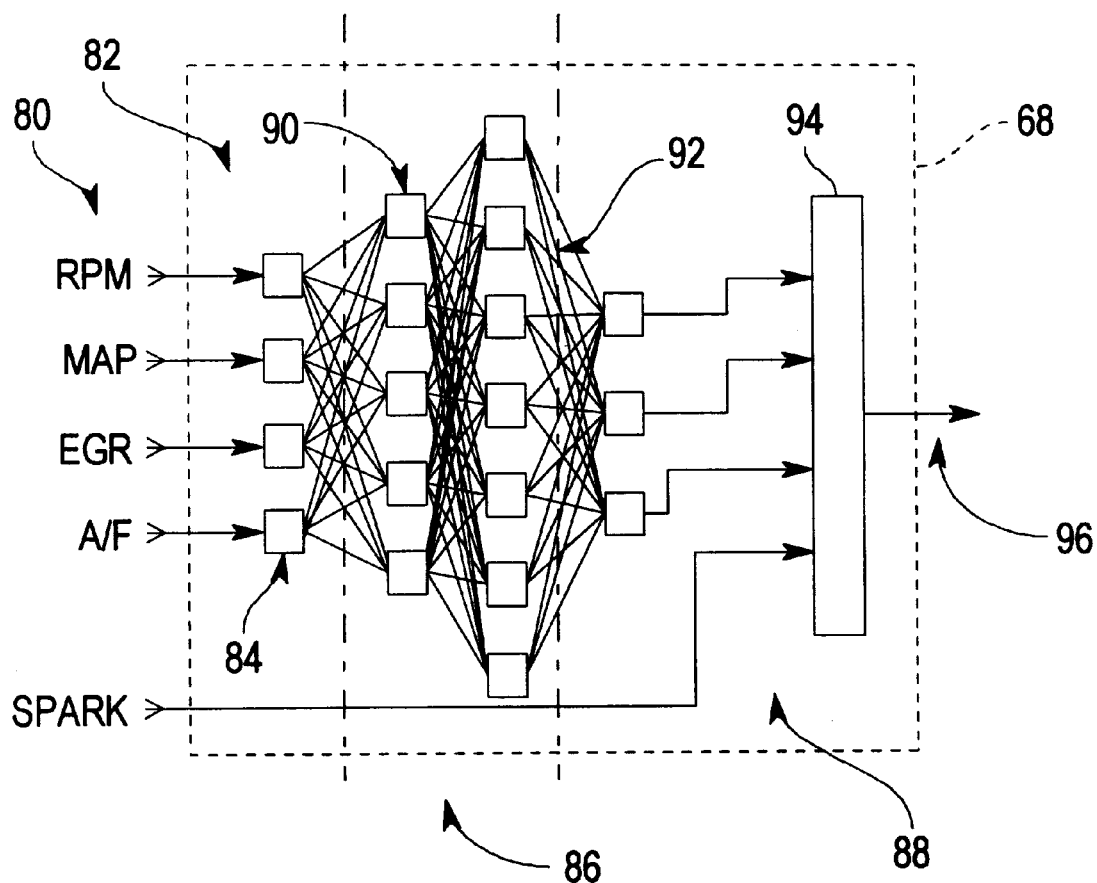
FIG. 2 is a block diagram illustrating a virtual sensor based on a neural network structure according to the present invention.

Referring now to FIG. 2, a block diagram illustrating a neural network structure for a virtual sensor according to the present invention is shown. Virtual sensor 68 includes various inputs 80 generated by physical sensors and/or other virtual sensors. An input layer 82 includes nodes 84 associated with each of the inputs 80. The neural network-based sensor 68 also includes one or more hidden layers 86 and an output layer 88. Nodes 84 of input layer 82 communicate with one or more nodes 90 of hidden layers 86 via connections 92. During training of the network, the various connections along with associated weights are determined. Block 94 represents a polynomial function of its inputs to generate a sensor output 96. The degree of the polynomial employed in block 94 is constrained to be one less than the number of nodes in output layer 88. For most virtual sensors, a feed-forward neural network will provide satisfactory performance. It should be recognized, however, that the number and structure of nodes for each layer will vary depending upon the particular parameter being determined.

The particular structure illustrated in FIG. 2 depicts a neural network for a set of engine performance variables using knowledge that most of the variables are low-order polynomial functions of the spark input when all the other parameters are fixed. Instead of predicting the output directly, the neural network of FIG. 2 predicts the polynomial coefficients represented by block 94 as functions of the other engine operating parameters. It should be noted that this type of neural-regression model is not restricted to the use of polynomials as any functional module may be employed which allows determination of the partial derivatives of the module's output with respect to the neural network's weights to be computed.

Indeed, the choice of non-polynomial functions is often preferred because of the tendency of interpolating polynomials to exhibit large errors when used to extrapolate outside the bounds of the underlying data.

Once a particular network structure or model is determined, the training of the network or the adjustment of the weights associated with each of the connections 92 between nodes or neurons can be carried out using established algorithms, such as the Levenburg-Marquardt algorithm or the Node Decoupled Extended Kalman filter algorithm developed by Puskorius and Feldkamp. For some engine control applications, the latter algorithm exhibits superior convergence properties resulting in faster training of the network while also yielding networks possessing better generalization capabilities compared to simple back propagation algorithms. It is desirable to utilize an architecture which is capable of representing a particular parameter map to a desired degree of accuracy while lending itself to automatic training procedures as explained and illustrated with reference to FIG. 3.

Figure 3:
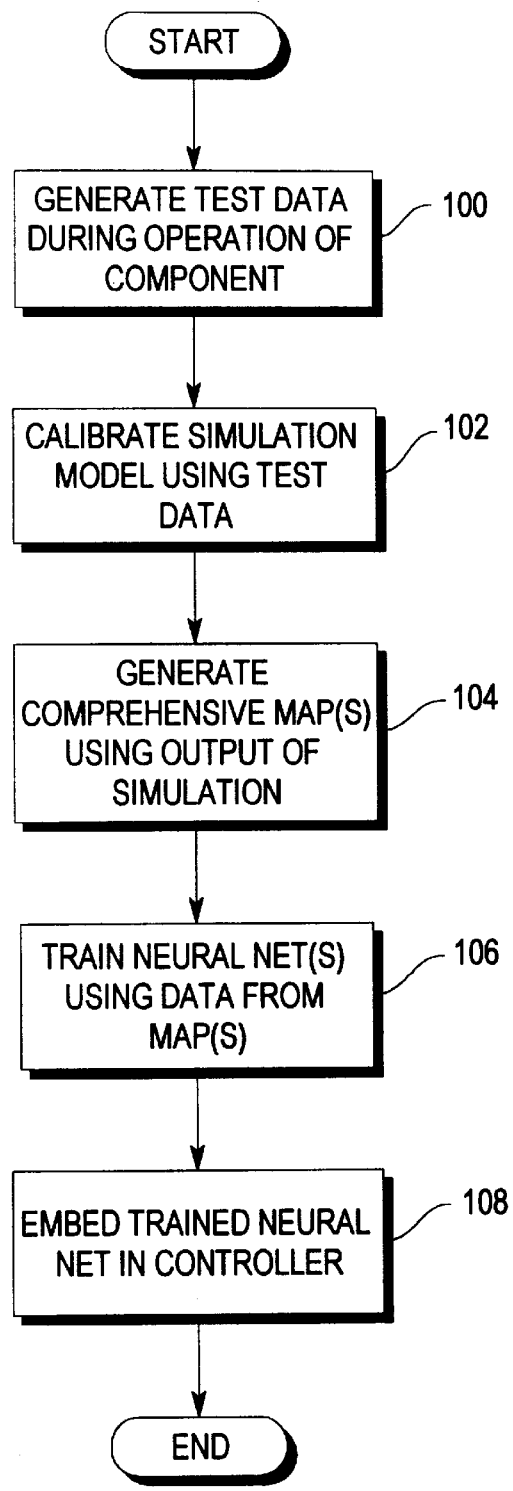
FIG. 3 is a flowchart illustrating a method for developing and manufacturing a virtual sensor according to the present invention.

Referring now to FIG. 3, a flowchart illustrating a method for manufacturing or developing neural network-based virtual sensors is shown. Block 100 represents the generation of test data during operation of a vehicle component, such as an engine. The test data provides representative values for a plurality of operating parameters for a particular set of operating conditions. To capture the relationship among the various inputs over all the operating conditions, it is desirable to generate a large set of data which reflects the typically non-linear relationship among basic engine operating parameters and the desired sensor output. Typically, this objective cannot be accomplished using conventional dynamometer testing alone because some engine parameters are not easily measured, and such a comprehensive map would be cost prohibitive. As such, the present invention requires only enough test data to calibrate a physically-based simulation model as represented by block 102.

Preferably, test data generated in block 100 are used to calibrate the simulation model represented by block 102 at one or several representative "anchor" points. The simulation program can then be used to interpolate or extrapolate a more complete set of data as represented by block 104. This comprehensive map characterizes performance of the vehicle component as a function of predetermined design and control parameters. This information is then used to program or train the neural network-based virtual sensor as represented by block 106. The sensor is then embedded in the controller in the form of data and instructions as represented by block 108.

The model-based mapping using established first principle parametric simulation models requires only about 1% of the experimental test data compared to the data required for a full empirical map. As such, the present invention has the potential for a two-thirds savings in cost while reducing the time required to generate a complete map from about a month to the order of a week.

As described above, the present invention may be utilized to provide a virtual sensor for any of a number of operating parameters for various vehicle components to realize a "virtual" closed-loop control system. As an example, the present invention may be utilized to provide a virtual sensor for engine control systems which dynamically determine the residual mass fraction using various physically-based sensor inputs.

The residual mass fraction (RMF), as used herein, refers to that fraction of the cylinder contents trapped in the current cycle which has been burned in some previous cycle. This may also be referred to as the burned gas fraction. RMF has both external and internal sources in conventional internal combustion engine operation. Exhaust gas recycling or recirculation (EGR) is the primary external source. EGR is introduced by routing some of the exhaust gases from the exhaust manifold back to the intake manifold via external plumbing. The amount of EGR introduced into the intake is regulated by an EGR valve at the point where the exhaust gases enter the intake manifold. The internal source (sometimes referred to as internal EGR) arises due to the inability of the gas exchange process in conventional engine designs to completely replace the burned gases with fresh air/fuel mixture. The amount of residual is influenced by the setting of the EGR valve, the throttle position, and the valve overlap, i.e. the period of time where both the intake and exhaust valves are open. Excessive dilution by residual from any source can degrade combustion quality. However, limited levels of residual under throttled operation have beneficial effects on emissions and fuel economy.

As RMF increases, it displaces fresh charge. In order to trap the fuel and air required to maintain the required level of engine torque output, the throttle must be opened up so that more total gases become trapped in the combustion chamber. The heat liberated by the combustion is distributed over a larger mass, thus lowering peak temperatures during combustion. Production of oxides of nitrogen ($NO_x$), being very sensitive to combustion temperature, is thereby reduced significantly. Opening up the throttle valve also increases the intake pressure which reduces throttling losses and improves fuel economy.

It is common practice to use EGR to control the level of RMF to maximize fuel economy and minimize $NO_x$ emissions at each speed and torque throughout the operating range of the engine. The appropriate amount of EGR is generally determined experimentally by testing the engine at each condition on a dynamometer prior to installation in the vehicle. The engine controller is then programmed to supply the correct level of EGR as a function of engine speed and torque.

With the advent of variable valve timing mechanisms as practical in-vehicle devices, the level of internal EGR can be controlled by changing the opening and closing times of the intake and exhaust valves. This method of controlling RMF can either supplant or complement the external EGR system. A control strategy analogous to the EGR methodology could be devised for variable valve timing. One could find an optimal valve timing at each operating condition and program the resulting set into the engine controller.

In either case, RMF is the fundamental engine parameter which is being controlled. The present invention may be utilized to develop a more robust control strategy since RMF may be dynamically determined and therefore controlled. Once the value for a particular parameter (RMF in this case) can be directly determined, traditional control techniques may be applied, i.e. comparing the measured value to the optimal, and adjusting either EGR or valve timing to correct any deviation.

The cycle simulation program used according to the present invention calculates the thermodynamic state of the engine as a function of time, or crank angle, during the combustion cycle. The simulation tracks pressures, temperatures, and composition of the gases in the cylinder, intake system, and exhaust system by solving a set of differential equations. The composition of the cylinder is governed by the conservation equations for total mass and fresh charge fraction:

$$m\dot{c}=\dot{m}_i\hat{c}_i-\dot{m}_e\hat{c}_e$$

$$\dot{m}=\dot{m}_i-\dot{m}_e$$

$$r=1-c$$

where:
    m represents the total mass in the cylinder,
    c represents the mass fraction of fresh charge in the cylinder,
    r represents the RMF in the cylinder,
    $\dot{m}_i$ represents the mass flow rate into the cylinder through the intake valve(s),
    $\dot{m}_e$ represents the mass flow rate out of the cylinder through the exhaust valve(s),
    $\hat{c}_i$ represents the charge fraction associated with $\dot{m}_i$ (c if $\dot{m}_i<0$, $c_i$ if $\dot{m}_i>0$),
    $\hat{c}_e$ represents the charge fraction associated with $\dot{m}_e$ (c if $\dot{m}_e>0$, $c_e$ if $\dot{m}_e<0$,
    $c_i$ represents charge fraction of gas residing in the intake port, and
    $c_e$ represents charge fraction of gas residing in the exhaust port.

The engine can then be tested at all the relevant speed/torque combinations representative of its operating range. At each point, dilution RMF can be varied by changing EGR and/or valve timing as previously described. The cycle simulation program can be used to calculate the value of RMF as these parameters are varied to generate a comprehensive map. When the optimal level of dilution is ascertained, the associated RMF is established as the target value for that speed and torque.

Meanwhile, the cycle simulation program can be used to calculate RMF as a function of all engine operating parameters (speed, torque, EGR, valve timing, spark advance, inlet temperature, etc.) These results can then be used to construct the virtual RMF sensor. If the virtual sensor is implemented through a neural net, these data comprise the training set by which the net learns the functional dependence of RMF on various other physical-based operating parameters. Of course, a virtual sensor according to the present invention may also use the outputs from various other virtual sensors as inputs.

During operation in the vehicle, the controller interrogates the virtual sensor to determine the RMF associated with the current values for the operating parameters. This RMF value is compared to the previously determined optimal value for the current operating conditions as described above. If necessary, the controller can signal the actuator(s) controlling the appropriate parameter(s) e.g, valve timing to move RMF toward the optimal value.

While the best mode for carrying out the invention has been described in detail, those familiar with the art to which this invention relates will recognize various alternative designs and embodiments for practicing the invention as defined by the following claims.

What is claimed is:

1. A method of manufacturing a sensor for use with a vehicle component having a controller in communication with a plurality of physical sensors each generating a signal indicative of first operating parameters, the sensor determining values for a second operating parameter based on values for the plurality of first operating parameters, the method comprising:

generating test data during operation of the vehicle component representative of values for the plurality of first operating parameters for a first set of operating conditions;

calibrating a simulator for simulating operation of the vehicle component using the test data;

generating at least one map which characterizes performance of the vehicle component as a function of predetermined parameters, the map being based on output of the simulator for a second set of operating conditions;

adjusting weights corresponding to nodes of a neural network based on the at least one map so as to develop a trained neural network; and embedding the trained neural network into the controller by storing a representation of the trained neural network in computer readable media, the representation including a plurality of instructions executable by a microprocessor and data representing the weights corresponding to the nodes of the neural network, such that the trained neural network determines values for the second operating parameter based on values for the plurality of first operating parameters.

2. The method of claim 1 wherein the vehicle component comprises an engine and wherein the step of generating test data comprises operating the engine on a dynamometer.

3. The method of claim 1 wherein the step of adjusting weights comprises adjusting weights corresponding to monotonically increasing piecewise differentiable function nodes of the neural network.

4. The method of claim 1 wherein the step of generating test data comprises generating test data at a plurality of representative anchor points.

5. The method of claim 4 wherein the step of generating at least one map comprises interpolating data based on the plurality of representative anchor points.

6. A method for controlling a vehicle component using a plurality of physical sensors for sensing first operating parameters and a controller in communication with the plurality of physical sensors, the method comprising:

monitoring signals generated by the plurality of physical sensors to determine values for the first operating parameters;

processing the values for the first operating parameters using a neural network embedded in the controller to determine a value for residual mass fraction, the value for residual mass fraction being based on a linear combination of the plurality of values for the first operating parameters such that the neural network functions as a sensor for the second operating parameter; and controlling the vehicle component based on the value of the second operating parameter.

7. The method of claim 6 wherein the step of processing comprises processing values representative of engine speed, manifold pressure, EGR, and air/fuel ratio.

8. The method of claim 6 wherein the step of processing comprises determining polynomial coefficients for residual mass fraction, the coefficients being functions of the first plurality of operating parameters.

* * * * *